US010262285B2

(12) United States Patent
Achtner et al.

(10) Patent No.: US 10,262,285 B2
(45) Date of Patent: Apr. 16, 2019

(54) CORRELATING RESOURCE UTILIZATION REQUIREMENTS BASED ON UTILIZATION OF AFFILIATED RESOURCES

(71) Applicant: BANK OF AMERICA CORPORATION, Charlotte, NC (US)

(72) Inventors: Edward J. Achtner, Kentfield, CA (US); Suma Nagappa Kumaraswamy, Santa Clara, CA (US); Natalie Elizabeth Tolles, San Francisco, CA (US); Caitlin Chrisman Bullock, Mountain View, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 190 days.

(21) Appl. No.: 15/463,515

(22) Filed: Mar. 20, 2017

(65) Prior Publication Data

US 2018/0205664 A1    Jul. 19, 2018

Related U.S. Application Data

(60) Provisional application No. 62/448,187, filed on Jan. 19, 2017.

(51) Int. Cl.
| | | |
|---|---|---|
| *G06F 15/173* | (2006.01) | |
| *G06F 15/16* | (2006.01) | |
| *G06Q 10/06* | (2012.01) | |
| *G06Q 50/00* | (2012.01) | |
| *H04L 29/08* | (2006.01) | |
| *H04L 29/06* | (2006.01) | |
| *G06F 17/30* | (2006.01) | |

(Continued)

(52) U.S. Cl.
CPC . *G06Q 10/06315* (2013.01); *G06F 17/30867* (2013.01); *G06Q 10/0631* (2013.01); *G06Q 10/06313* (2013.01); *G06Q 50/01* (2013.01); *H04L 47/70* (2013.01); *H04L 63/10* (2013.01); *H04L 67/22* (2013.01); *H04L 67/306* (2013.01); *G06F 3/0482* (2013.01); *Y04S 10/54* (2013.01)

(58) Field of Classification Search
CPC .......... G06F 17/30867; G06Q 10/0631; H04L 47/70; H04L 63/10; H04L 67/306
USPC ......... 709/201–203, 217–219, 225–226, 229
See application file for complete search history.

(56) References Cited

U.S. PATENT DOCUMENTS

| 5,696,961 A | 12/1997 | Briscoe et al. |
|---|---|---|
| 6,269,343 B1 | 7/2001 | Pallakoff |

(Continued)

*Primary Examiner* — Bharat Barot
(74) *Attorney, Agent, or Firm* — Michael A. Springs; Moore & Van Allen PLLC; Nicholas C. Russell

(57) ABSTRACT

Systems, computer program products, and methods are described herein for correlating resource utilization requirements based on utilization of affiliated resources. The present invention is configured to retrieve information associated with one or more resources associated with a user; receive a query, wherein the query is associated with a resource distribution goal; determine one or more peers associated with the user; retrieve one or more resource distribution profiles associated with each of the one or more peers associated with the user from one or more network platforms; determine a first resource distribution profile determined to enable the user to achieve the resource distribution goal from the distribution profiles of the one or more peers; and implement the first distribution profile to the one or more resources associated with the user.

20 Claims, 2 Drawing Sheets

(51) Int. Cl.
*H04L 12/911* (2013.01)
*G06F 3/0482* (2013.01)

(56) References Cited

U.S. PATENT DOCUMENTS

| | | |
|---|---|---|
| 6,714,967 B1 | 3/2004 | Horvitz |
| 7,216,002 B1 | 5/2007 | Anderson |
| 7,668,747 B2 | 2/2010 | Murphy et al. |
| 7,672,897 B2 | 3/2010 | Chung et al. |
| 7,702,687 B2 * | 4/2010 | Govindarajan ......... G06F 9/465 709/217 |
| 8,010,418 B1 | 8/2011 | Lee |
| 8,150,416 B2 | 4/2012 | Ribaudo et al. |
| 8,301,495 B2 | 10/2012 | Mason |
| 8,402,387 B1 | 3/2013 | Iversen |
| 8,611,326 B2 | 12/2013 | Huang |
| 8,631,414 B2 * | 1/2014 | Gargash ................. G06F 9/548 709/226 |
| 8,700,711 B2 | 4/2014 | Travis et al. |
| 8,930,204 B1 | 1/2015 | Igoe et al. |
| 9,092,211 B2 | 7/2015 | Ng et al. |
| 9,154,564 B2 | 10/2015 | Heidt et al. |
| 9,223,832 B2 | 12/2015 | Hamborg et al. |
| 9,336,332 B2 | 5/2016 | Davis et al. |
| 9,355,172 B2 | 5/2016 | Howes et al. |
| 9,369,536 B1 | 6/2016 | Holtzclaw et al. |
| 9,531,808 B2 | 12/2016 | Singh et al. |
| 2006/0294112 A1 * | 12/2006 | Mandato ........... H04L 29/06027 709/201 |
| 2009/0300195 A1 * | 12/2009 | Devdhar ................. H04L 47/10 709/229 |
| 2014/0074978 A1 * | 3/2014 | Yu ........................... H04L 67/02 709/217 |
| 2014/0207518 A1 | 7/2014 | Kannan et al. |
| 2014/0207561 A1 | 7/2014 | Dandekar et al. |
| 2015/0127728 A1 | 5/2015 | Marti et al. |
| 2015/0149631 A1 * | 5/2015 | Lissack ............... H04L 41/5051 709/226 |
| 2015/0221036 A1 | 8/2015 | Sharma et al. |
| 2016/0171557 A1 | 6/2016 | Fanous et al. |
| 2016/0321328 A1 | 11/2016 | Duckworth et al. |
| 2018/0026904 A1 * | 1/2018 | Van De Groenendaal ................... H04L 67/306 709/226 |

\* cited by examiner

US 10,262,285 B2

CORRELATING RESOURCE UTILIZATION REQUIREMENTS BASED ON UTILIZATION OF AFFILIATED RESOURCES

CLAIM OF PRIORITY UNDER 35 U.S.C. § 119

This Non-Provisional Patent Application claims priority to Provisional Application No. 62/448,187 titled "System for Integration of Social Media Platform For Resource Distribution" filed Jan. 19, 2017, assigned to the assignee hereof and hereby expressly incorporated by reference herein.

BACKGROUND

With the amount of information available today, it can be challenging for a user or entity as a whole to identify resources that are of interest, importance, and/or relevance. Individuals and entities alike continuously strive to maximize the utilization of the identified resources at the smallest level of operation by distributing the resources based on constraints, protocols, and metrics. However, identification and distribution of these resources based on constraints, protocols, and metrics may pose the challenge to any user. There is a need for a system to leverage network platforms to leverage peer activity to determine effective distribution of resources.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for distribution of resources based on resource distribution profiles associated with one or more peers of a user is presented. The system comprises at least one non-transitory storage device; at least one processor; and at least one module stored in said storage device and comprising instruction code that is executable by the at least one processor and configured to cause said at least one processor to: retrieve information associated with one or more resources associated with a user; electronically receive, via a user computing device, a query, wherein the query is associated with a resource distribution goal; determine one or more peers associated with the user, wherein the one or more peers have been identified by the user; retrieve one or more resource distribution profiles associated with each of the one or more peers associated with the user from one or more network platforms; determine a first resource distribution profile based on at least the one or more resource distribution profiles associated with each of the one or more peers associated with the user, wherein the first resource distribution profile is determined to enable the user to achieve the resource distribution goal; initiate a control signal configured to cause the user computing device to display the first resource distribution profile; electronically receive, via the user computing device, a user input indicating an implementation of the first distribution profile to the one or more resources associated with the user; and implement the first distribution profile to the one or more resources associated with the user.

In some embodiments, the module is further configured to: electronically receive, via the user computing device, an indication to select one or more peers from the user; initiate a first user interface for display on the user computing device, wherein the first user interface comprises one or more peers of the user; and electronically receive, via the user computing device, a user selection of at least one of the one or more peers of the user.

In some embodiments, the module is further configured to: establish a communication link with one or more network platforms associated with each of the one or more peers selected by the user; and retrieve a resource distribution profile associated with each of the one or more peers from the one or more network platforms.

In some embodiments, the module is further configured to: receive one or more parameters associated with the one or more resources of the user; apply the one or more parameters to the first distribution profile; determine a modified distribution profile based on at least applying the one or more parameters to the first distribution profile; and implement the modified distribution profile to the one or more resources associated with the user.

In some embodiments, the module is further configured to: determine a likelihood associated with the user achieving the resource distribution goal based on at least the implementation of the first resource distribution profile.

In some embodiments, the module is further configured to: determine one or more customized resource distribution profiles based on at least the one or more resource distribution profiles associated with each of the one or more peers associated with the user, wherein the one or more customized resource distribution profiles are determined to enable the user to achieve the resource distribution goal, wherein each of the one or more customized resource distribution profiles comprises a likelihood associated with the user achieving the resource distribution goal based on at least the implementation of the one or more customized resource distribution profile; and generate a distribution dashboard for display on the user computing device, wherein the distribution dashboard comprises one or more distribution scenarios for the user, wherein the one or more distribution scenarios are associated with the implementation of at least one of the one or more customized resource distribution profiles.

In some embodiments, the module is further configured to: electronically receive, via the user computing device, a user input indicating a preview of an implementation of at least one of the one or more distribution scenarios for the user; implement at least one portion associated with the at least one of the one or more distribution scenarios; generate, for display on the distribution dashboard, a distribution outlook based on at least the implementation of the at least one portion associated with the at least one of the one or more distribution scenarios, wherein the distribution outlook comprises a likelihood associated with the user achieving the resource distribution goal based on at least the implementation of the at least one portion associated with the at least one of the one or more distribution scenarios.

In another aspect, a computerized method for distribution of resources based on resource distribution profiles associated with one or more peers of a user is presented. The method comprises retrieving, using a computing device, information associated with one or more resources associated with a user; electronically receiving, via a user computing device, a query, wherein the query is associated with a resource distribution goal; determining, using a computing device, one or more peers associated with the user, wherein the one or more peers have been identified by the user; retrieving, using a computing device, one or more resource distribution profiles associated with each of the one or more peers associated with the user from one or more network platforms; determining, using a computing device, a first resource distribution profile based on at least the one or more resource distribution profiles associated with each of the one or more peers associated with the user, wherein the first resource distribution profile is determined to enable the user to achieve the resource distribution goal; initiating, using a computing device, a control signal configured to cause the user computing device to display the first resource distribution profile; electronically receiving, via the user computing device, a user input indicating an implementation of the first distribution profile to the one or more resources associated with the user; and implementing, using a computing device, the first distribution profile to the one or more resources associated with the user.

In yet another aspect, a computer program product for distribution of resources based on resource distribution profiles associated with one or more peers of a user is presented. The computer program product comprising a non-transitory computer-readable medium comprising code causing a first apparatus to: retrieve information associated with one or more resources associated with a user; electronically receive, via a user computing device, a query, wherein the query is associated with a resource distribution goal; determine one or more peers associated with the user, wherein the one or more peers have been identified by the user; retrieve one or more resource distribution profiles associated with each of the one or more peers associated with the user from one or more network platforms; determine a first resource distribution profile based on at least the one or more resource distribution profiles associated with each of the one or more peers associated with the user, wherein the first resource distribution profile is determined to enable the user to achieve the resource distribution goal; initiate a control signal configured to cause the user computing device to display the first resource distribution profile; electronically receive, via the user computing device, a user input indicating an implementation of the first distribution profile to the one or more resources associated with the user; and implement the first distribution profile to the one or more resources associated with the user.

BRIEF DESCRIPTION OF THE DRAWINGS

Figure 1:
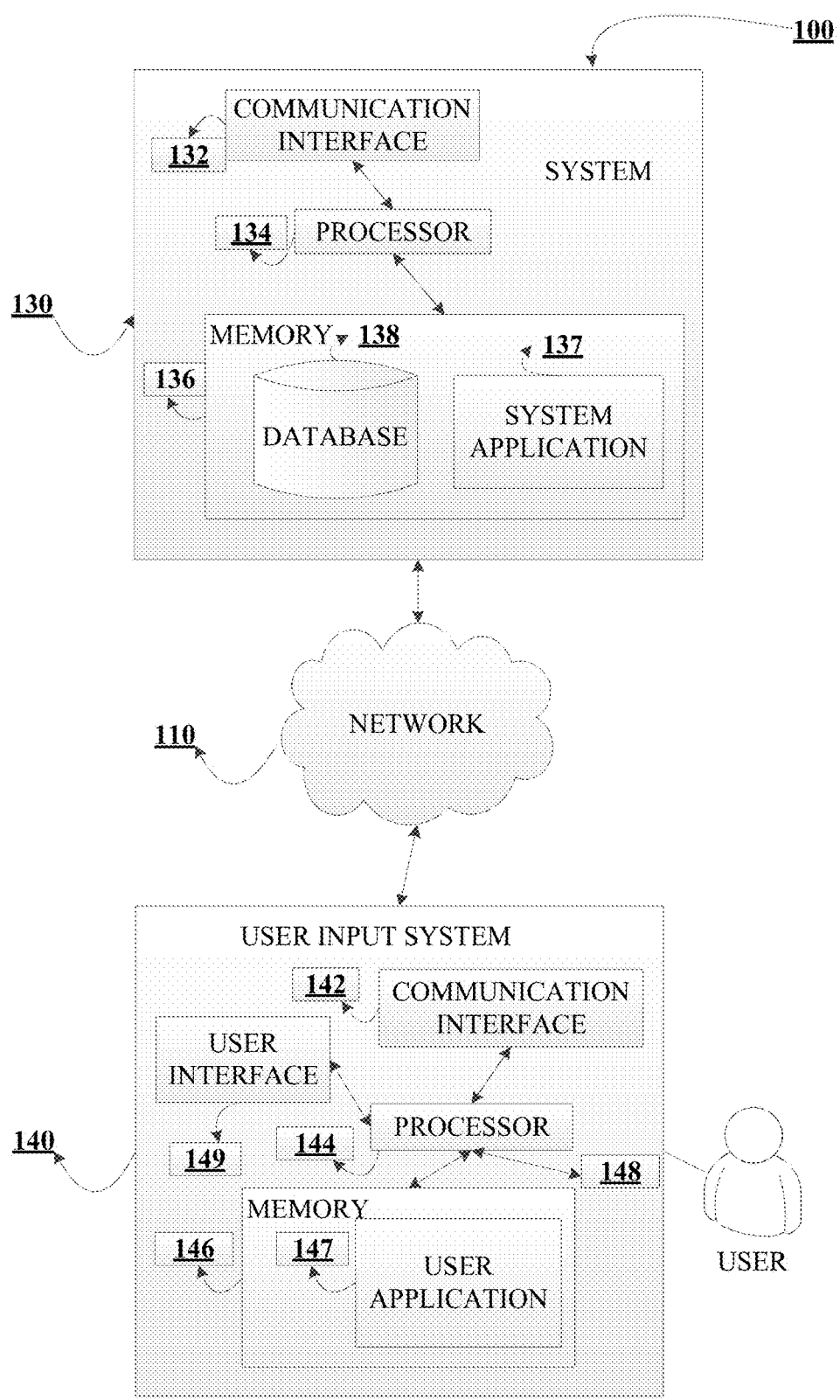
Figure 2:
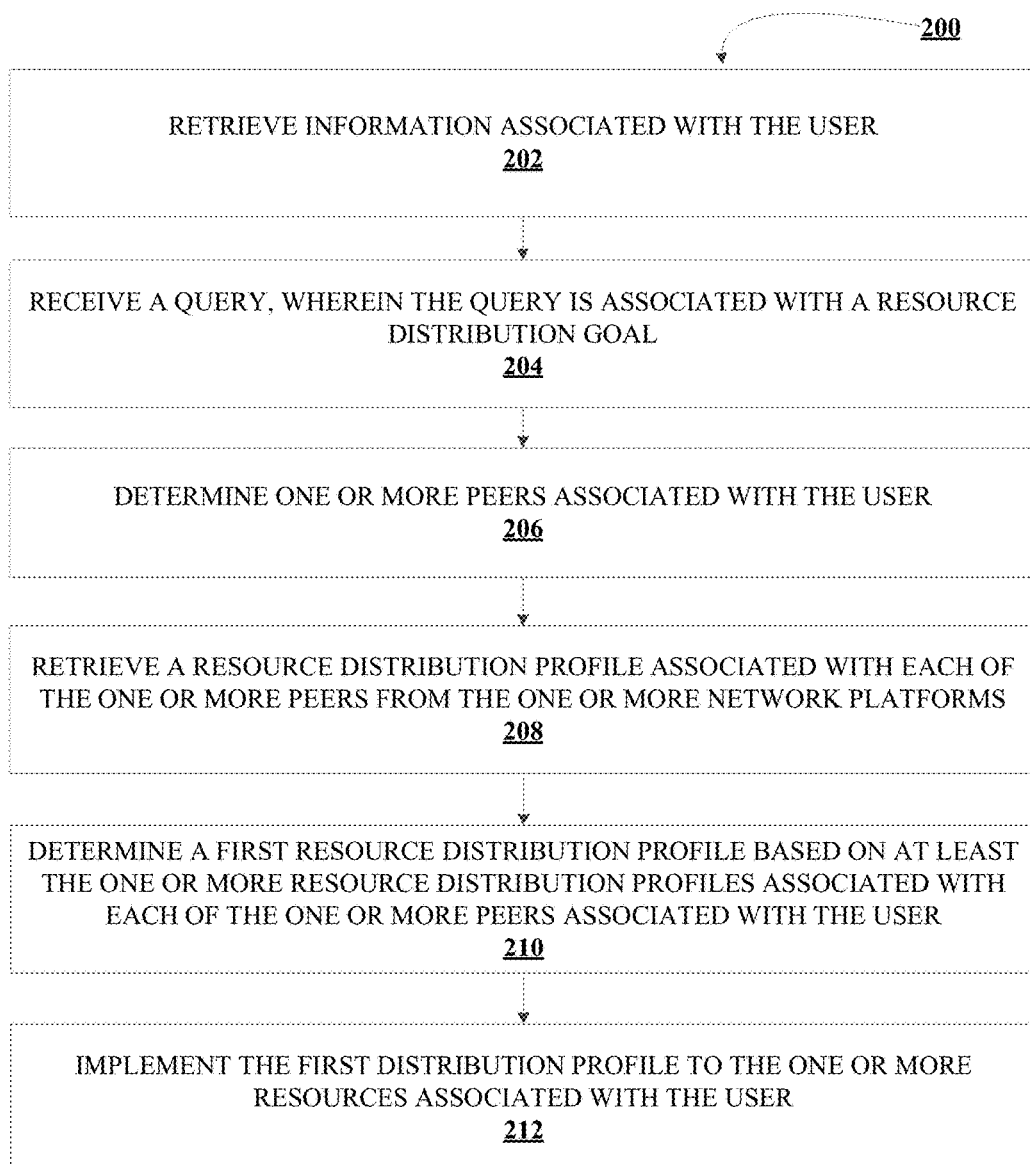

Having thus described embodiments of the invention in general terms, reference will now be made to the accompanying drawings, where:

FIG. 1 illustrates technical components of a system for correlating resource utilization requirements based on utilization of affiliated resources, in accordance with an embodiment of the invention; and FIG. 2 illustrates a general process flow for correlating resource utilization requirements based on utilization of affiliated resources, in accordance with an embodiment of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Embodiments of the invention are directed to systems, methods and computer program products for leveraging social media platforms by analyzing large volumes of data available on social media and extracts key insights to improve product and service development, customer service, customer service, marketing, exposure management, business performance, or the like. In some embodiments, the present invention integrates the social media platform into a proprietary platform associated with the entity to deliver enriched client experiences, such as assisting clients with their lifestyle priorities and the improvement of their financial life.

In some embodiments, an "entity" as used herein may refer to an organization comprising multiple individuals such as an institution or an association that has a collective goal and external environment. Typically, organizations have a management structure that determines relationships between different activities and the members, and subdivides and assigns roles, responsibilities, and authority to carry out different tasks. For purposes of the invention, resources may indicate one or more hardware and/or software available to the user and enables the user to work towards the collective goal of the entity.

In some embodiments, the "user" may be an individual who operates the user input system described herein and is associated with an entity under a contract of employment, either part-time or full-time.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, a "resource" includes accounts and/or other property that may be made available to the user. In most example implementations contemplated herein, the resource is an ownership interest in a privately-held business entity that is transitioning to be a publicly-held business entity. Consequently, many example implementations envision the "resource" (either in whole or in its constituent parts, as shares of stock, including fractional shares. Notwithstanding the foregoing, the term "resource" need not be artificially limited to the context of stock and/or shares in a business entity, but rather the term "resource" can encompass a broad range of example items, including monetary assets, collections and portions thereof (such as collections of art, possessions, and/or other goods), commodities, accounts, other property, and the like.

As used herein, "network platform," "social media," or "social media platform" refers to any online social networking platform that enables people to interact with each other over a computer network, e.g., the Internet, and create online communities whose members often share common interests, hobbies, backgrounds, and the like. These services may be web-based and provide various ways for users to interact, such as chat, messaging, email, video, voice chat, file sharing, blogging, discussion groups, and so on. Social networking services may contain directories of categories (e.g., former classmates) and tools to enable users to connect with friends and colleagues.

In the context of example implementations described herein, a "transaction" or "resource distribution" refers to any transfer of resources to and/or from a user. A transaction may refer to a purchase of shares of stock, goods, or and/or other resources.

The present invention utilizes resources and recommendations based on predetermined parameters. In this way, the invention gathers information associated with the user and a specific set of people that the user associated with. When the user is attempting to make a decision, the system may be configured to gather information from social media activity of the specific set of people the user associates with and provide the user with options to make the decision. In some embodiments, the system may be configured to aggregate user experiences from their financial activity directly from the user instead of aggregating them from other social media platforms. For example, I see you ate at a restaurant yesterday, how would you rate it? This information may be aggregated to give the user's peers recommendation on similar activities. In another embodiment, if the user wishes to go out to eat dinner, but is on a specific budget, the present invention can provide reviews and information based on what the user's peers/friends did recently within that budget. In yet another embodiment, if the closest bank location to the user is X, but the reviews from other people (peers) about X talks about issues with parking, long lines, or the like the user may be informed before going to the location, about possible positive/negative issues associated with going there and can help them plan accordingly. In some cases, the system may provide recommendations for alternate banking facilities.

FIG. 1 presents an exemplary block diagram of the system environment 100 for which the distributive network system with specialized data feeds associated with resource distribution. FIG. 1 provides a unique system that includes specialized servers and system communicably linked across a distributive network of nodes required to perform the functions of the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

FIG. 2 illustrates a general process flow for correlating resource utilization requirements based on utilization of affiliated resources 200, in accordance with an embodiment of the invention. As shown in block 202, the process flow includes retrieving information associated with the user. As described herein, information associated with the user may be based on at least the user profile, user assets and liabilities, social media activity, or the like. In some embodiments, the information associated with the user may be accessed via one or more applications installed on the user computing device. In retrieving information associated with the one or more resources associated with the user, the system may be configured to initiate the one or more applications, which otherwise remain dormant in the background of the user computing device. In one aspect, the one or more application are not running in the background of the computing device, and are initiated by the system to access user information. In some embodiments, the system may be configured to initiate a communication link to one or more external computing systems, external networks, or the like, to retrieve information associated with the user.

In some embodiments, the user may be required to authenticate identity for access to an application, device, or network, or for access to a particular feature, function or action of an application or device. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

In some embodiments, the system may be configured to receive one or more authentication credentials from the user, and validate the authentication credentials. In response to a successful validation of the authentication credentials, the system may be configured to access the information associated with the user. In some embodiments, the system may be configured to enable the user to restrict the system to access only a portion of the information via the one or more applications. In this regard, the system may be configured to enable the user to manually input additional information that is not retrievable via the one or more applications.

In some embodiments, the user may restrict access to the information by selecting one or more features of the application when providing authentication credentials. Accordingly, a continuum of authentication may be used to quantify (or dictate) the levels of authentication. Likewise, a continuum of functions permitted may be used to quantify (or dictate) the number or context in which functions are permitted. The continuum generally represents the number of credentials required and/or the relative strength of the credentials required for that point on the continuum. For example, with respect to an online banking application, a username may enable the user to gain access to checking balance, a username and password may enable the user to gain access to checking balance, funds transfer between the user's first bank account and second bank account, and downloading previous statements, and a username, password and challenge question may enable the user to gain complete access to all the functions of the applications and devices. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, and a bill-pay. In yet another aspect, the user may have to only provide authentication credentials corresponding to authentication type A to gain access to minimal functions associated with the application. For example, the user may provide a username to access a balance check.

Next, as shown in block 204, the process flow includes receiving a query, wherein the query is associated with a resource distribution goal. In some embodiments, the query may be associated with optimal distribution of user resources to achieve the goal. In some embodiments, the resource distribution goal may be associated with the utilization of the one or more resources of the user to a specific capacity as defined by the user. The goal of capacity planning is to identify the right amount of resources required to meet service demands now and in the future. In this regard, the query may indicate a type of resource distribution goal. For example, a query may indicate a resource distribution goal associated with maximizing savings associated with the one or more resources, maximizing the utilization of the one or more resources, investing one or more resources for future use, one or more utilization options for the one or more resources, or the like. In some embodiments, the resource distribution goal may be determined automatically, and recommended for implementation to the user. In this regard, the system may be configured to gather and analyze usage patterns associated with the current utilization of the one or more resources and recommend one or more resource distribution goals for the user by projecting capacity requirements and performance characteristics.

Next, as shown in block 206, the process flow includes determining one or more peers associated with the user. In some embodiments, the one or more peers are identified by the user. In some other embodiments, the one or more peers are identified automatically based on same or similar profiles as that of the user. In this regard, the system may be configured to determine the user profile based on at least one or more past transactions of the user, a geographic location of the user, an income level, an amount of outgoing funds, asset values, liability values, asset types, spending habits, saving habits or the like. In one aspect, the user profile includes at least information identifying the user. In some embodiments, the system may be configured to establish predefined user profiles including, but not limited to travel profiles, homebody, luxury spender, thrifty saver, risk taker, or the like. For example, for the thrifty saver lifestyle the user may indicate that he/she may downsize the user's home in retirement, sell a vacation home, reduce travel expenses, or the like. The profiles may be pre-programmed by the financial institution and/or programmable by the user to illustrate how the user plans on living in retirement. Other lifestyles illustrate if the user will spend less, the same, or more during retirement. In some embodiments, the system may be configured to enable the user to customize the user profile. In this regard, the system may be configured to enable the user to select at least one of the predetermined user profiles and customize the at least one selected user profile according to the characteristics of the user by providing additional information. In one aspect, the system may be configured to initiate presentation of one or more options to enable the user to provide the additional information to customize the selected predetermined user profile.

In this regard, the system may be configured to initiate a user interface for display on the user computing device, wherein the user interface comprises the one or more peers of the user. In response, the system may be configured to receive, via the user computing device, a user selection of at least one of the one or more peers of the user. Once the user selection of the one or more peers are received, the system may then be configured to establish a communication link with one or more network platforms associated with each of the one or more peers selected by the user. In doing so, the system may be configured to retrieve a resource distribution profile associated with each of the one or more peers from the one or more network platforms, as shown in block 208.

Next, as shown in block 210, the process flow includes determining a first resource distribution profile based on at least the one or more resource distribution profiles associated with each of the one or more peers associated with the user. In this regard, the first resource distribution profile is determined to enable the user to achieve the resource distribution goal. In some embodiments, the system may be configured to determine one or more customized resource distribution profiles based on at least the one or more resource distribution profiles associated with each of the one or more peers associated with the user. In this regard, each of the one or more customized resource distribution profiles comprises a likelihood associated with the user achieving the resource distribution goal based on at least the implementation of the one or more customized resource distribution profile.

In some embodiments, the system may be configured to determine a similarity level of the user profile with the user profile of one or more peers of the user. In one aspect, the similarity level may be an alpha-numeric ranking. In some embodiments, the similarity level may be skewed based on the resource distribution goal of the user. In one aspect, the system may be configured to determine a plurality of features associated with the resource distribution goal of the user and determine the one or more peers accordingly. In one example, if the resource distribution goal of the user is related to geographic location of the user, the system may then be configured to determine one or more peers of the user based on the geographic similarity of the one or more peers to that of the user and thereby skew the similarity level of the user profile with the user profiles of the one or more peers of the user based on the geographic location of the one or more peers of the user.

In response, the system may be configured to generate a distribution dashboard for display on the user computing device, wherein the distribution dashboard comprises one or more distribution scenarios for the user. In some embodiments, the one or more distribution scenarios are associated with the implementation of at least one of the one or more customized resource distribution profiles. In one aspect, the system may be configured to electronically receive, via the user computing device, a user input indicating a preview of an implementation of at least one of the one or more distribution scenarios for the user. In response, the system may implement at least one portion associated with the at least one of the one or more distribution scenarios. In doing so, the system may then generate, for display on the distribution dashboard, a distribution outlook based on at least the implementation of the at least one portion associated with the at least one of the one or more distribution scenarios. In some embodiments, the distribution outlook comprises a likelihood associated with the user achieving the resource distribution goal based on at least the implementation of the at least one portion associated with the at least one of the one or more distribution scenarios.

Next, as shown in block 212, the process flow includes implementing the first distribution profile to the one or more resources associated with the user. In this regard, the system may be configured to initiate a control signal configured to cause the user computing device to display the first resource distribution profile to the user. In some embodiments, the first resource distribution profile is associated with the one or more customized resource distribution profiles. In response, the system may be configured to electronically receive, via the user computing device, a user input indicating an implementation of the first distribution profile to the one or more resources associated with the user.

In some embodiments, the system may be configured to receive one or more parameters associated with the one or more resources of the user. In one aspect, the one or more parameters may include limiting the use of at least a portion of the one or more resources of the user. In one aspect, the system may be configured to receive the one or more parameters before determining the first resource distribution profile. In this way, the system may be configured to determine the first resource distribution profile based on the one or more received parameters. In another aspect, the system may be configured to receive the one or more parameters after determining the first distribution profile. In this regard, the system may be configured to apply the one or more parameters to the first distribution profile. In response, the system may determine a modified distribution profile based on at least applying the one or more parameters to the first distribution profile. In response to determining a modified distribution profile, the system may be configured to implement the modified distribution profile to the one or more resources associated with the user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/463,434 | SYSTEM FOR PLATFORM ACTIVITY GATHERING FOR ALTERNATIVE RESOURCE GENERATION | Concurrently herewith |
| 15/463,444 | SYSTEM FOR PLATFORM ACTIVITY GATHERING FOR DETERMINING CURRENT USER RESOURCE REQUIREMENTS | Concurrently herewith |
| 15/463,449 | SYSTEM FOR PLATFORM ACTIVITY GATHERING FOR ACHIEVEMENT LEVERAGING VIRTUAL VISUALIZATION | Concurrently herewith |
| 15/463,456 | RESOURCE AND EXPERIENCE FACTOR VALUE GENERATION SYSTEM | Concurrently herewith |

What is claimed is:

1. A system for distribution of resources based on resource distribution profiles associated with one or more peers of a user, the system comprising:
   at least one non-transitory storage device;
   at least one processor; and at least one module stored in said storage device and comprising instruction code that is executable by the at least one processor and configured to cause said at least one processor to:

retrieve information associated with one or more resources associated with a user;

electronically receive, via a user computing device, a query, wherein the query is associated with a resource distribution goal;

determine one or more peers associated with the user, wherein the one or more peers have been identified by the user;

retrieve one or more resource distribution profiles associated with each of the one or more peers associated with the user from one or more network platforms;

determine a first resource distribution profile based on at least the one or more resource distribution profiles associated with each of the one or more peers associated with the user, wherein the first resource distribution profile is determined to enable the user to achieve the resource distribution goal;

initiate a control signal configured to cause the user computing device to display the first resource distribution profile;

electronically receive, via the user computing device, a user input indicating an implementation of the first distribution profile to the one or more resources associated with the user; and implement the first distribution profile to the one or more resources associated with the user.

2. The system of claim 1, wherein the module is further configured to:

electronically receive, via the user computing device, an indication to select one or more peers from the user;

initiate a first user interface for display on the user computing device, wherein the first user interface comprises one or more peers of the user; and electronically receive, via the user computing device, a user selection of at least one of the one or more peers of the user.

3. The system of claim 2, wherein the module is further configured to:

establish a communication link with one or more network platforms associated with each of the one or more peers selected by the user; and retrieve a resource distribution profile associated with each of the one or more peers from the one or more network platforms.

4. The system of claim 1, wherein the module is further configured to:

receive one or more parameters associated with the one or more resources of the user;

apply the one or more parameters to the first distribution profile;

determine a modified distribution profile based on at least applying the one or more parameters to the first distribution profile; and implement the modified distribution profile to the one or more resources associated with the user.

5. The system of claim 1, wherein the module is further configured to:

determine a likelihood associated with the user achieving the resource distribution goal based on at least the implementation of the first resource distribution profile.

6. The system of claim 1, wherein the module is further configured to:

determine one or more customized resource distribution profiles based on at least the one or more resource distribution profiles associated with each of the one or more peers associated with the user, wherein the one or more customized resource distribution profiles are determined to enable the user to achieve the resource distribution goal, wherein each of the one or more customized resource distribution profiles comprises a likelihood associated with the user achieving the resource distribution goal based on at least the implementation of the one or more customized resource distribution profile; and generate a distribution dashboard for display on the user computing device, wherein the distribution dashboard comprises one or more distribution scenarios for the user, wherein the one or more distribution scenarios are associated with the implementation of at least one of the one or more customized resource distribution profiles.

7. The system of claim 6, wherein the module is further configured to:

electronically receive, via the user computing device, a user input indicating a preview of an implementation of at least one of the one or more distribution scenarios for the user;

implement at least one portion associated with the at least one of the one or more distribution scenarios;

generate, for display on the distribution dashboard, a distribution outlook based on at least the implementation of the at least one portion associated with the at least one of the one or more distribution scenarios, wherein the distribution outlook comprises a likelihood associated with the user achieving the resource distribution goal based on at least the implementation of the at least one portion associated with the at least one of the one or more distribution scenarios.

8. A computerized method for distribution of resources based on resource distribution profiles associated with one or more peers of a user, the method comprising:

retrieving, using a computing device, information associated with one or more resources associated with a user;

electronically receiving, via a user computing device, a query, wherein the query is associated with a resource distribution goal;

determining, using a computing device, one or more peers associated with the user, wherein the one or more peers have been identified by the user;

retrieving, using a computing device, one or more resource distribution profiles associated with each of the one or more peers associated with the user from one or more network platforms;

determining, using a computing device, a first resource distribution profile based on at least the one or more resource distribution profiles associated with each of the one or more peers associated with the user, wherein the first resource distribution profile is determined to enable the user to achieve the resource distribution goal;

initiating, using a computing device, a control signal configured to cause the user computing device to display the first resource distribution profile;

electronically receiving, via the user computing device, a user input indicating an implementation of the first distribution profile to the one or more resources associated with the user; and implementing, using a computing device, the first distribution profile to the one or more resources associated with the user.

9. The method of claim 8, wherein the method further comprises:

electronically receiving, via the user computing device, an indication to select one or more peers from the user;

initiating a first user interface for display on the user computing device, wherein the first user interface comprises one or more peers of the user; and electronically receiving, via the user computing device, a user selection of at least one of the one or more peers of the user.

10. The method of claim 9, wherein the method further comprises:

establishing a communication link with one or more network platforms associated with each of the one or more peers selected by the user; and retrieving a resource distribution profile associated with each of the one or more peers from the one or more network platforms.

11. The method of claim 8, wherein the method further comprises:

receiving one or more parameters associated with the one or more resources of the user;

applying the one or more parameters to the first distribution profile;

determining a modified distribution profile based on at least applying the one or more parameters to the first distribution profile; and implementing the modified distribution profile to the one or more resources associated with the user.

12. The method of claim 8, wherein the method further comprises:

determining a likelihood associated with the user achieving the resource distribution goal based on at least the implementation of the first resource distribution profile.

13. The method of claim 8, wherein the method further comprises:

determining one or more customized resource distribution profiles based on at least the one or more resource distribution profiles associated with each of the one or more peers associated with the user, wherein the one or more customized resource distribution profiles are determined to enable the user to achieve the resource distribution goal, wherein each of the one or more customized resource distribution profiles comprises a likelihood associated with the user achieving the resource distribution goal based on at least the implementation of the one or more customized resource distribution profile; and generating a distribution dashboard for display on the user computing device, wherein the distribution dashboard comprises one or more distribution scenarios for the user, wherein the one or more distribution scenarios are associated with the implementation of at least one of the one or more customized resource distribution profiles.

14. The method of claim 13, wherein the method further comprises:

electronically receiving, via the user computing device, a user input indicating a preview of an implementation of at least one of the one or more distribution scenarios for the user;

implementing at least one portion associated with the at least one of the one or more distribution scenarios;

generating, for display on the distribution dashboard, a distribution outlook based on at least the implementation of the at least one portion associated with the at least one of the one or more distribution scenarios, wherein the distribution outlook comprises a likelihood associated with the user achieving the resource distribution goal based on at least the implementation of the at least one portion associated with the at least one of the one or more distribution scenarios.

15. A computer program product for distribution of resources based on resource distribution profiles associated with one or more peers of a user, the computer program product comprising a non-transitory computer-readable medium comprising code causing a first apparatus to:

retrieve information associated with one or more resources associated with a user;

electronically receive, via a user computing device, a query, wherein the query is associated with a resource distribution goal;

determine one or more peers associated with the user, wherein the one or more peers have been identified by the user;

retrieve one or more resource distribution profiles associated with each of the one or more peers associated with the user from one or more network platforms;

determine a first resource distribution profile based on at least the one or more resource distribution profiles associated with each of the one or more peers associated with the user, wherein the first resource distribution profile is determined to enable the user to achieve the resource distribution goal;

initiate a control signal configured to cause the user computing device to display the first resource distribution profile;

electronically receive, via the user computing device, a user input indicating an implementation of the first distribution profile to the one or more resources associated with the user; and implement the first distribution profile to the one or more resources associated with the user.

16. The computer program product of claim 15, wherein the first apparatus is further configured to:

electronically receive, via the user computing device, an indication to select one or more peers from the user;

initiate a first user interface for display on the user computing device, wherein the first user interface comprises one or more peers of the user; and electronically receive, via the user computing device, a user selection of at least one of the one or more peers of the user.

17. The computer program product of claim 16, wherein the first apparatus is further configured to:

establish a communication link with one or more network platforms associated with each of the one or more peers selected by the user; and retrieve a resource distribution profile associated with each of the one or more peers from the one or more network platforms.

18. The computer program product of claim 15, wherein the first apparatus is further configured to:

receive one or more parameters associated with the one or more resources of the user;

apply the one or more parameters to the first distribution profile;

determine a modified distribution profile based on at least applying the one or more parameters to the first distribution profile; and implement the modified distribution profile to the one or more resources associated with the user.

19. The computer program product of claim 15, wherein the first apparatus is further configured to:
determine a likelihood associated with the user achieving the resource distribution goal based on at least the implementation of the first resource distribution profile.

20. The computer program product of claim 15, wherein the first apparatus is further configured to:
determine one or more customized resource distribution profiles based on at least the one or more resource distribution profiles associated with each of the one or more peers associated with the user, wherein the one or more customized resource distribution profiles are determined to enable the user to achieve the resource distribution goal, wherein each of the one or more customized resource distribution profiles comprises a likelihood associated with the user achieving the resource distribution goal based on at least the implementation of the one or more customized resource distribution profile; and
generate a distribution dashboard for display on the user computing device, wherein the distribution dashboard comprises one or more distribution scenarios for the user, wherein the one or more distribution scenarios are associated with the implementation of at least one of the one or more customized resource distribution profiles.

* * * * *